United States Patent [19]

Taylor

[11] 4,285,362

[45] Aug. 25, 1981

[54] POWER TRANSMISSION

[75] Inventor: Henry D. Taylor, Pontiac, Mich.

[73] Assignee: Sperry Corporation, Troy, Mich.

[21] Appl. No.: 117,933

[22] Filed: Feb. 4, 1980

[51] Int. Cl.³ .......... F16K 31/383

[52] U.S. Cl. .......... 137/489; 137/492.5

[58] Field of Search .......... 137/489, 492, 492.5, 137/491, 115

[56] References Cited

U.S. PATENT DOCUMENTS

| | | | |
|---|---|---|---|
| 2,043,453 | 6/1936 | Vickers | 137/489 X |
| 3,143,134 | 8/1964 | Karpis | 137/489 X |
| 3,373,763 | 3/1968 | Smilges | 137/491 X |
| 3,578,018 | 5/1971 | Dillon | 137/491 X |
| 3,923,075 | 12/1975 | Farrell | 137/491 |
| 4,083,375 | 4/1978 | Johnson | 137/489 X |
| 4,138,929 | 2/1979 | Peterson | 137/489 X |

*Primary Examiner*—Alan Cohan

*Attorney, Agent, or Firm*—Theodore Van Meter; Joseph S. Failla

[57] ABSTRACT

A hydraulic pressure relief circuit including a main valve, a bleed flow orifice to provide stability to the main valve, a pilot valve having a differential area piston and a damping orifice in conjunction with an accumulator chamber. System pressure is limited by opening the main valve and allowing fluid flow from the system back to tank. The main valve is controlled as a bleed flow servo wherein the pilot valve meters the bleed flow from the bleed flow orifice to tank thereby controlling the opening of the main valve. Fluid flow through the damping orifice in conjunction with the accumulator chamber acts on the pilot valve to provide damping forces acting on the pilot valve with both rising and falling system pressures thereby limiting the maximum rate of pressure increase in the circuit.

24 Claims, 5 Drawing Figures

NON-DAMPED RELIEF VALVE CIRCUIT

DAMPED RATE LIMITING RELIEF VALVE CIRCUIT

POWER TRANSMISSION

This application discloses and claims subject matter disclosed in the copending application Ser. No. 024,058 filed Mar. 26, 1979, now U.S. Pat. No. 4,201,052 having a common assignee with the present patent application.

BACKGROUND AND SUMMARY

This invention relates to hydraulic pressure relief valves and circuits and, more particularly, to rate damped relief valves and circuits.

A relief valve is used in hydraulic circuits to limit the maximum pressure that can develop. However in hydraulic circuits utilizing relief valves, undesirable momentary high pressures above the set limit or overshoot can develop in response to transient conditions. Such a transient condition, for example, can occur when a lowering load is brought to an abrupt halt generating momentary pressure rate increases in the system ranging between approximately 120,000 to 3,000,000 psi per second. Such repeated overshoots tend to shorten the service life of affected system components.

The present invention is directed to a novel hydraulic pressure relief valve and circuit that will eliminate the overshoot under most conditions and limit the maximum rate of pressure increase in the system.

To this end, the invention comprises a hydraulic pressure relief circuit which includes a main valve which can be either a slide or poppet type of conventional design, a flow restricting bleed flow orifice to control the main valve, a pilot valve having a differential area piston, and a flow restricting damping orifice in conjunction with an accumulator volume to provide overdamping of the pilot valve. System pressure is limited by opening the main valve and allowing flow from the system line back to tank. The main valve is controlled as a bleed servo wherein the pilot valve meters the bleed flow from the bleed flow orifice to tank thereby controlling the opening of the main valve. Fluid flow through the damping orifice, in conjunction with the accumulator, limits the rate of pressure rise which acts on the pilot valve thereby limiting the maximum rate of pressure increase in the main system circuit.

A fuller understanding of the invention may be had from consideration of the following description and claims taken together with the accompanying drawings.

DETAILED DESCRIPTION

Figure 1:
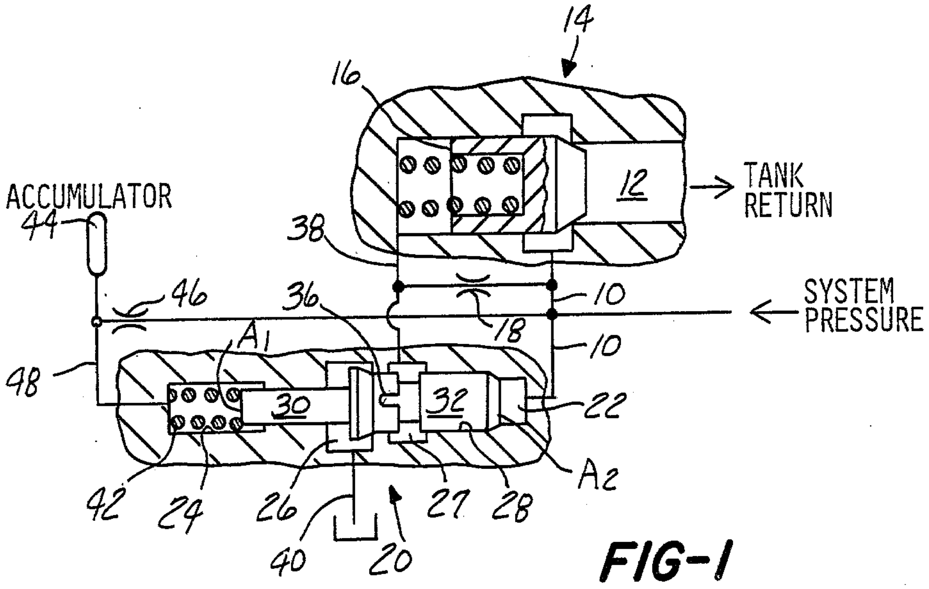
FIG. 1 is a schematic of the hydraulic pressure relief valve circuit.

Referring to FIG. 1, the hydraulic pressure relief valve circuit embodying the invention includes a system pressure line 10 adapted to be connected to a source of system pressure extending to a main stage valve 14 and a tank return line 12 adapted to be connected to a tank or reservoir. Main stage valve 14, which may be either a poppet or slide type valve of conventional design is spring loaded at its rear or large area end 16 to yieldingly shut off flow between lines 10 and 12. System pressure is limited by opening main stage valve 14 and allowing flow from pressure line 10 to tank return line 12 back to the tank. Main stage valve 14 is controlled by a pilot circuit which includes a bleed flow orifice 18 positioned between line 10 and rear end 16 of valve 14. A pilot valve 20 controls the bleed flow and thereby the opening of main valve 14.

Pilot valve 20 includes a pilot bore 22, having a spring end 24, a drain chamber 26, a bleed flow chamber 27, and a pressure end 28, in which a differential area piston is mounted for movement. The piston includes a reduced piston section 30 in spring end 24 and a metering piston section 32 extending from drain chamber 26 into pressure end 28. Piston sections 30 and 32 are formed with a reduced area $A_1$ and pressure area $A_2$, respectively, with metering piston section 32 having one or more metering slots 36 formed therein in open communication with bleed flow chamber 27.

A bleed flow line 38 extends between the rear end 16 of main valve 14 and bleed flow chamber 27. Slot 36 meters the bleed flow from rear end 16 of main valve 14 through line 38 into drain chamber 26 and on to the tank through a metered flow line 40. A spring member 42 bearing against reduced area $A_1$ yieldingly urges the differential area piston of valve 20 toward pressure end 28 to shut off metered flow between chambers 26 and 27. Pilot valve 20 has spring end 24 of bore 22 and a fluid compression means, such as, a contained volume or accumulator 44 connected to system pressure downstream of a damping orifice 46 through a damping flow line 48.

The differential area piston of valve 20 in conjunction with damping orifice 46 and accumulator 44 provides for a damping action on the pressure rise of system pressure in the circuit. Pressure exerted on area $A_2$ of piston section 32 tends to open fluid flow through metering slot 36 and pressure exerted on reduced area $A_1$ of piston section 30 tends to close off flow through metering slot 36. This permits damping forces to be developed in the following manner.

If system pressure rises rapidly, area $A_2$ being in direct communication with system pressure, will sense the pressure rise immediately. The pressure sensed by area $A_1$ will rise more slowly because sufficient flow of fluid must be developed either through damping orifice 46 or by displacement of area $A_1$ to compress fluid in accumulator 44, as presently described. The rate of pressure increase sensed at area $A_1$ is controlled by the sizes selected for damping orifice 46 and accumulator 44. If the rate of pressure rise in the system pressure is sufficiently high, the difference in pressures acting on areas $A_1$ and $A_2$ will generate a force sufficient to overcome the spring force exerted by spring member 42 and open the pilot valve 20 through metering slot 36 and thereby the opening of main valve 14 dumping system fluid flow to tank. A rapid drop in system pressure, while the main valve is relieving, will have an opposite effect. The damping orifice 46 will restrict fluid flow that develops as the result of decompression of the fluid volume in accumulator 44, causing pressure sensed at area $A_1$ to remain higher than the pressure sensed at area $A_2$ thereby acting to close pilot valve 20. Damping forces are therefore developed with both rising and falling system pressures.

The cracking pressure $C_p$ of pilot valve 20 is determined by the difference in piston areas $A_1$ and $A_2$ and a force $F_s$ exerted by the pilot valve spring member 42. Thus, the cracking pressure has the following relationship to the cross-sectional areas $A_1$ and $A_2$:

$$C_p=(F_s/A_2-A_1)$$

If system pressure rises above this value, the net force exerted on the two piston areas $A_1$ and $A_2$ will exceed the force of spring member 42 and the piston will move to further compress the spring 42, uncovering metering slot 36 resulting in metering the bleed flow to tank. The metered bleed flow reduces the pressure at the large end 16 of main stage valve 14 and valve 14 opens allowing system pressure to return to tank resulting in a drop in the system pressure. The circuit will operate as a closed-loop servo and will maintain system pressure at, or slightly above, the cracking pressure of pilot valve 20.

Speed of response of the circuit is governed by the rate of spring member 42 and the width of metering slot 36. With a reasonably fast response, damping orifice 46 in conjunction with accumulator 44 will prevent instability and add damping to the extent that the speed of response is overdamped thereby limiting the maximum rate of increase of the system pressure. The value of this limit is a function of the volume of accumulator 44 and the size of damping orifice 46. The maximum rate of increase can be established at a desired level by selecting the proper size of each.

Figure 2A:
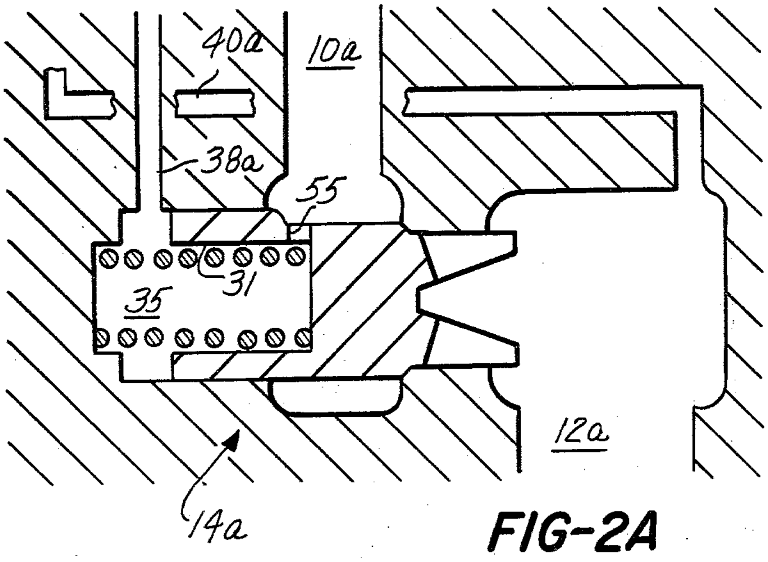
FIG. 2*a* is a partial sectional view of FIG. 2 showing an alternate location of the bleed flow orifice.
Figure 2:
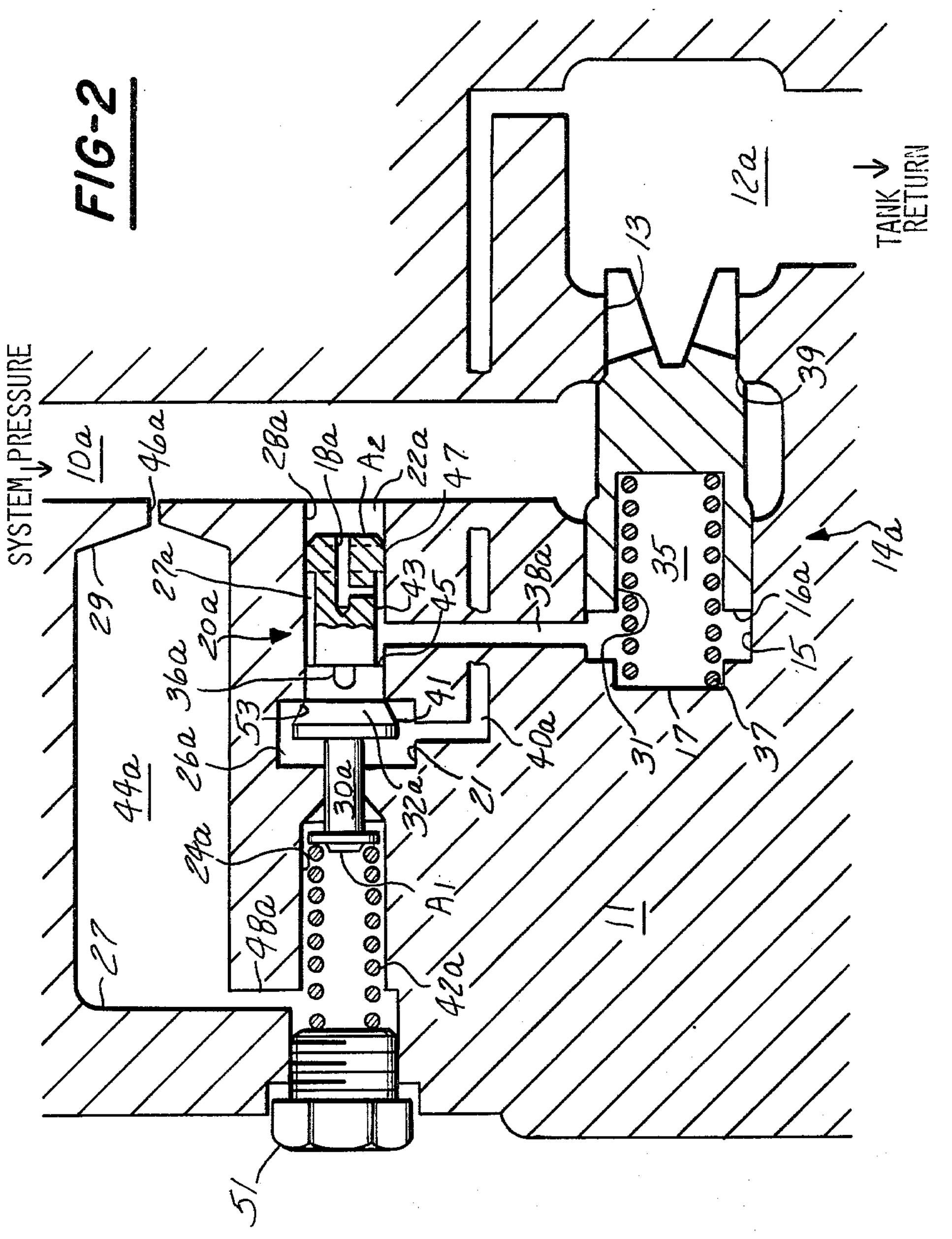
FIG. 2 is a partial sectional view of a preferred embodiment thereof.

FIG. 2 shows a preferred embodiment of the hydraulic circuit as a unitary body relief valve wherein corresponding elements are provided with a suffix a.

The relief valve circuit of FIG. 1 as shown is housed in a body 11, FIG. 2, having a system pressure passage 10*a* and a return flow passage 12*a* spaced therefrom by a main bore 13 having a rear end portion 15 which terminates at an end wall 17 spaced from pressure passage 10*a*. A pilot bore 22*a* formed in body 11 in spaced relation to main bore 13 includes a system pressure end 28*a*, an enlarged intermediate portion 21 forming a drain chamber 26*a*, and a spring end 24*a*. Pressure end 28*a* extends from and transversely from pressure passage 10*a* and is in communication with rear end portion 15 of main bore 13 through a bleed flow passage 38*a*. Intermediate portion 21 of pilot bore 22*a* is in communication with return flow passage 12*a* through metered flow passage 40*a*. Body 11 also includes a contained volume 44*a* having a first end 27 in communication with spring end 24*a* of pilot bore 22*a* through an accumulator passage 48*a* and a second end 29 in communication with pressure passage 10*a* through a damping orifice 46*a*.

A main valve piston 14*a* is movably mounted in main bore 13 to yieldingly shut off flow between pressure passage 10*a* and return passage 12*a*. Piston 14*a* includes a large area end 16*a* having a counterbore 31 formed therein which together with rear end portion 15 and end wall 17 of main bore 13 define a main chamber 35 in which a main valve spring 37 functions to urge main valve piston 14*a* in seated engagement with valve seat 39 formed in main bore 13.

A pilot valve 20*a* is mounted for movement in pilot bore 22*a*. Pilot valve 20*a* comprises a two-piece differential area piston having a reduced area piston 30*a* extending from metering chamber 26*a* into spring end 24*a* of pilot bore 22*a* and a metering piston 32*a* extending from drain chamber 26*a* into pressure end 28*a* of pilot bore 22*a*.

Metering piston 32*a* is formed with a tapered portion 41 positioned in drain chamber 26*a* in abutting relation to reduced area piston 30*a*. A shoulder portion 45 of metering piston 32*a* extends into pressure end 28*a* of bore 22*a* and a reduced diameter portion of metering piston 32*a* spaces shoulder portion 45 from a head portion 47 of metering piston 32*a*. Shoulder portion 45 and head portion 47 define therebetween a bleed flow chamber 27*a* in pressure end 28*a* of bore 22*a* in which one end of bleed flow passage 38*a* terminates. Bleed flow chamber 27*a* is in communication with pressure passage 10*a* through a bleed flow orifice 18*a* formed in head portion 47. Metering piston 32*a* is further provided with one or more metering slots 36*a* formed on shoulder portion 45 which are in communication with bleed flow chamber 27*a*. A spring member 42*a* is positioned in pilot bore 22*a* between spring piston 30 and an adjustment member 51 in threaded engagement with body 11 and yieldingly urges metering piston 32*a* into seated engagement with a valve seat 53 formed in bore 22*a* adjacent drain chamber 26*a*. Inward or outward movement of adjustment member 51 relative to body 11 varies the amount of compression of spring 42*a* thereby providing a means for adjusting the cracking pressure level at which the relief valve will relieve.

Figure 3:
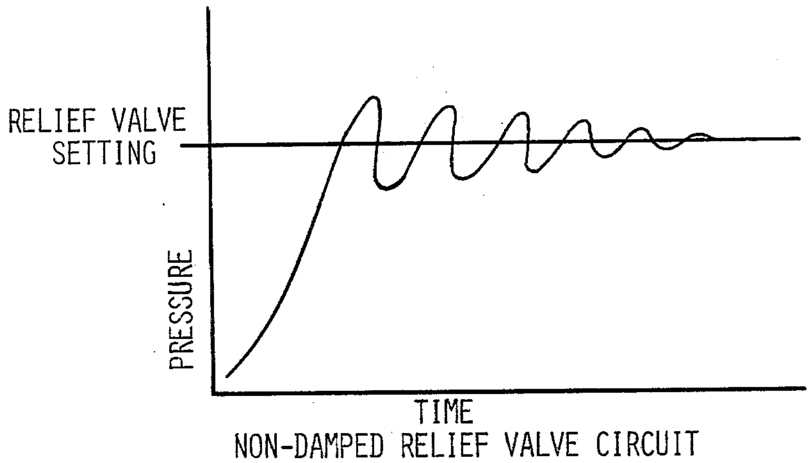
FIG. 3 is a graphical showing of an undesirable transient pressure rise in terms of pressure and time in a non-damped relief valve circuit.
Figure 4:
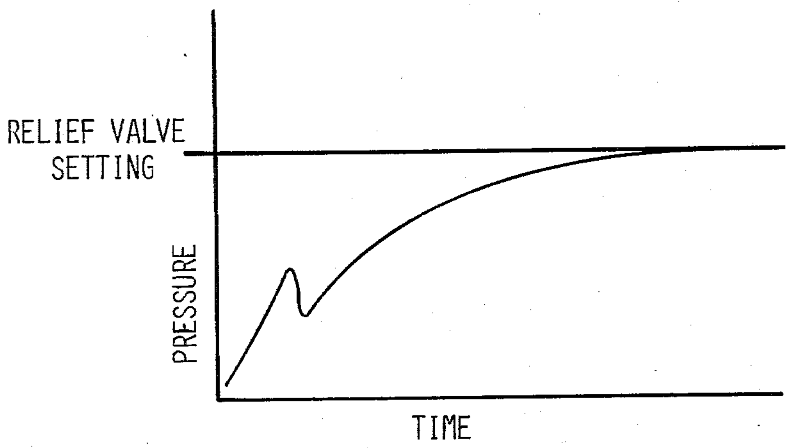
FIG. 4 is a graphical showing of a desirable relationship of a transient pressure rise in terms of pressure and time in a damped relief valve circuit embodying the invention.

FIGS. 3 and 4 shown in graphical form a comparison of the rate of pressure rise in a non-damped relief valve circuit, FIG. 3, and a damped rate limiting relief valve, FIG. 4, constructed in accord with the instant invention. Both circuits have the same predetermined steady-state relief valve setting. However, for a typical system with a conventional relief valve, as shown in FIG. 3, several oscillations occur where the pressures exceed the relief valve setting before the system stabilizes. In such a system, the relief valve setting is first reached much more rapidly than in the rate limited circuit. The momentary overshoots exceed the relief valve setting and the rate of pressure rise may range approximately between 3,000,000 to 120,000 psi per second resulting in shocks in the system that tend to shorten the service life of affected system components.

The graph of FIG. 4 shows that, for a circuit embodying the invention, the initial pressure rise is the same in both cases but with rate limiting the rise is more gradual and is relatively peak free with only a moderate pressure rise peak occurring well below the steady-state pressure setting. The moderate peak occurs just prior to the opening of the main valve with a pressure rise of approximately 40,000 to 80,000 psi per second.

It will be apparent to those skilled in the art that many changes may be made to the above described invention without departing from the spirit of the invention and the scope of the appended claims.

An example of such changes is shown in FIG. 2*a*, wherein reference numeral 55 shows the bleed flow orifice 18*a* of FIG. 2 formed through the wall of counterbore 31 communicating pressure passage 10*a* with bleed flow chamber 27*a* (FIG. 2) through main valve chamber 35 and bleed flow passage 38*a*.

What is claimed is:

1. A hydraulic pressure relief valve circuit comprising:

a. a source of system pressure and a return tank;

b. a main valve means operable to shut off fluid flow between said source of system pressure and said return tank;

c. bleed flow means connected to said source of system pressure and to said main valve means for restricting fluid flow to said main valve means;
d. pilot valve means for metering fluid flow restricted by said bleed flow means to said return tank, and having first and second ends, said first end connected to both said source of system pressure and said main valve means;
e. accumulator means connected to said source of system pressure and said second end of the pilot valve means for containing a volume of compressed fluid; and
f. damping means connected between said source of system pressure and said second end of the pilot valve means and said accumulator means for restricting fluid flow from said source of system pressure to both said pilot valve means and said accumulator means.

2. The circuit of claim 1 wherein said main valve means includes a large area end and said bleed flow means is connected between said source of system pressure and said large area end.

3. The circuit of claim 2 wherein said pilot valve means is connected to said large area end.

4. The circuit of claim 3 wherein said pilot valve means includes a bleed flow chamber connected to said bleed flow means and said bleed flow means and said bleed flow chamber is connected to said large area end.

5. The circuit of claim 4 wherein said pilot valve means includes a drain chamber and said pilot valve means is operable to shut off fluid flow between said drain chamber and said bleed flow chamber.

6. The circuit of claim 5 wherein said pilot valve means includes one or more metering slots in communication with said bleed flow chamber, and said pilot valve means is operable to open said bleed flow chamber to said drain chamber through said metering slots.

7. The circuit of claim 6 wherein said drain chamber is connected to said return tank.

8. The circuit of claim 1 wherein said pilot valve means includes a differential area piston and a spring member, said piston operable to yieldingly shut off metered fluid flow to said return tank, said piston having a large area arranged in said first end of the pilot valve means in communication with said source of system pressure and a reduced area arranged in said second end of the pilot valve means in communication with both said accumulator means and said damping means.

9. The circuit of claim 8 wherein said differential area piston is operable to meter fluid flow to said return tank upon sensing a predetermined cracking pressure, said cracking pressure ($C_p$) being determined by the difference between the areas of said reduced area ($A_1$), said large area ($A_2$), and a force ($F_s$) exerted by said spring member having the following relationship:

$$C_p = F_s/A_2 - A_1.$$

10. The circuit of claim 9 wherein said differential area piston is of a two-piece construction which includes a reduced area piston in abutting relation to a metering piston, the reduced area piston having said reduced area formed thereon and the metering piston having said large area formed thereon.

11. A hydraulic pressure relief valve comprising:
a. a body;
b. a system pressure passage and a tank return passage formed in said body in spaced relationship;
c. a main bore formed in said body extending between said pressure passage and said tank return passage;
d. a main valve mounted for movement in said main bore yieldingly urged to shut off fluid flow between said system pressure and said tank return passages;
e. a pilot bore formed in said body spaced from said main bore and having first and second ends, said first end in communication with both said system pressure passage and said main bore;
f. a bleed flow passage formed in said body extending from said main bore to said pilot bore;
g. a drain passage formed in said body extending from said pilot bore to said tank return passage;
h. a pilot valve mounted for movement in said pilot bore yieldingly urged to shut off fluid flow between said bleed flow and said drain passages;
i. a bleed flow orifice positioned in said body to restrict fluid flow from said system pressure passage to said bleed flow passage;
j. a metering slot formed in said pilot valve adapted upon movement of said pilot valve to meter fluid flow from said bleed flow passage to said drain passage;
k. a contained volume adapted for containing compressed fluid formed in said body spaced from said pilot bore and in communication with both said system pressure passage and said second end of the pilot bore; and
l. a damping orifice formed in said body in communication with and between said system pressure passage and both said contained volume and said second end of the pilot bore; said damping orifice restricting fluid flow from said system pressure passage to both said second end of the pilot bore and said contained volume.

12. The relief valve of claim 11 wherein said pilot valve includes a differential area piston and a spring member positioned in said second end of the pilot bore and acting on said piston, said piston having a large area arranged said first end of the pilot bore in communication with said system pressure passage and a reduced area arranged said second end of the pilot bore in communication with both said contained volume and said damping orifice.

13. The relief valve of claim 12 wherein said differential area piston is operable to meter fluid flow to said drain passage upon sensing a predetermined cracking pressure, said cracking pressure ($C_p$) being determined by the difference between the reduced area ($A_1$) and the large area ($A_2$) of said piston and a force ($F_s$) exerted by said spring member having the following relationship:

$$C_p = F_s/A_2 - A_1.$$

14. The relief valve of claim 13 wherein said differential area piston is of a two-piece construction which includes a reduced area piston in abutting relation to a metering piston, the reduced area piston having said reduced area formed thereon and the metering piston having said large area formed thereon.

15. The relief valve of claim 11 wherein said main valve includes a large area end in communication with said bleed flow passage and said bleed flow orifice restricting fluid flow from said system pressure passage to said large area end.

16. The relief valve of claim 15 wherein said pilot valve includes a bleed flow chamber in communication with said bleed flow passage and a drain chamber in communication with said drain passage; and said pilot valve being operable to shut off fluid flow between said chambers.

17. The relief valve of claim 16 wherein said pilot valve includes one or more metering slots in communication with said bleed flow chamber and said pilot valve being operable to open said bleed flow chamber to said drain chamber through said metering slot.

18. The relief valve of claim 11 wherein said bleed flow orifice is formed through said pilot valve.

19. The relief valve of claim 11 wherein said bleed flow orifice is formed through said main valve.

20. A rate limiting pilot valve for a hydraulic pressure circuit, said pilot valve comprising:

a. a body;

b. a bore formed in said body having a pressure end and a spring end spaced from said pressure end, said pressure end adapted for connection to a source of system pressure;

c. a bleed flow chamber formed in said bore and adapted for connection to a source of fluid bleed flow from a main valve in the circuit;

d. a drain chamber formed in said bore and adapted for connection to a tank return;

e. an accumulator chamber adapted for containing a volume of compressed fluid in open communication with said spring end;

f. a damping orifice in communication with said spring end of the bore and said accumulator chamber and adapted for connection between said source of system pressure and both said spring end and said accumulator chamber for restricting fluid flow from said source of system pressure to both said spring end and said accumulator chamber;

g. a differential area piston mounted for movement in said bore; and h. a metering slot formed in said piston between said bleed flow chamber and said drain chamber and adapted upon movement of said piston to meter fluid flow from said bleed flow chamber to said drain chamber.

21. The pilot valve of claim 20 wherein a spring member positioned in said spring end bears against said piston yieldingly urging said piston to shut off said metered fluid flow between said bleed flow chamber and said drain chamber.

22. The pilot valve of claim 21 wherein said piston includes a reduced piston section positioned in said spring end having a reduced area ($A_1$) and a metering piston section positioned in said pressure end and having a pressure area ($A_2$), said reduced area sensing the pressure in said accumulator chamber and said pressure area sensing system pressure, said piston operable to meter fluid flow from said bleed flow chamber to said drain chamber upon sensing a predetermined cracking pressure.

23. The pilot valve of claim 22 wherein said cracking pressure ($C_p$) being determined by the difference between said reduced area ($A_1$), said pressure area ($A_2$) and the force ($F_s$) exerted by said spring member having the following relationship:

$$C_p = F_s/A_2 - A_1.$$

24. The pilot valve of claim 23 wherein said bleed flow chamber is formed between the walls of said bore and a reduced diameter section of said metering piston.

* * * * *